(12) United States Patent
Furuta et al.

(10) Patent No.: US 6,225,889 B1
(45) Date of Patent: *May 1, 2001

(54) METHOD OF PRODUCING ROLLING CODE AND KEYLESS ENTRY APPARATUS USING THE SAME

(75) Inventors: Noritoshi Furuta; Masahiro Goto, both of Okazaki (JP)

(73) Assignee: Nippon Soken, Inc., Nishio (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,979

(22) Filed: Dec. 24, 1996

(30) Foreign Application Priority Data

Dec. 25, 1995 (JP) .................................................... 7-337379

(51) Int. Cl.$^7$ ............................... B60R 25/10; G06F 7/04
(52) U.S. Cl. ................ 340/426; 340/425.5; 340/825.31; 341/176; 341/174
(58) Field of Search ................................ 380/21, 23, 25, 380/9, 49, 28, 262; 341/42, 176, 173, 178; 340/825.31, 825.34, 426, 425.5, 825.69, 825.32, 825.37

(56) References Cited

U.S. PATENT DOCUMENTS

| | | | |
|---|---|---|---|
| 5,185,798 | * | 2/1993 | Hamada et al. ........................ 380/23 |
| 5,369,706 | | 11/1994 | Latka . |
| 5,412,379 | * | 5/1995 | Waraksa et al. ................. 340/825.72 |
| 5,563,600 | * | 10/1996 | Miyake ................. 341/173 |
| 5,600,324 | * | 2/1997 | Miyake ................. 341/176 |
| 5,774,550 | * | 6/1998 | Brinkmeyer et al. ................. 380/23 |
| 6,028,527 | * | 2/2000 | Soenen et al. ................. 340/825.31 |

FOREIGN PATENT DOCUMENTS 6-239202    8/1994  (JP) .

* cited by examiner

*Primary Examiner*—Gail Hayes
*Assistant Examiner*—Ho S. Song
(74) *Attorney, Agent, or Firm*—Pillsbury Winthrop LLP

(57) ABSTRACT

A rolling code producing method is provided which may be employed in a keyless entry system for automotive vehicles designed to compare a rolling code derived in a receiver installed in the vehicle and a rolling code derived in a portable transmitter to allow authorized access to the vehicle if both the rolling codes match. The rolling code producing method includes producing different rolling codes, in sequence, using an initial code variable according to a given algorithm and changing the initial code variable in response to insertion of an initial code variable memory card carried by a vehicle operator into the receiver.

13 Claims, 8 Drawing Sheets

FIG. 3

| ADDRESS NO. | SUBCODE | INITIAL CODE VARIABLE | FLAG |
|---|---|---|---|
| 1. | 1234 | 00000001 | 0 |
| 2. | 5678 | 001affff | 1 |
| 3. | 90ab | e0e01010 | 1 |
| 4. | cdef | abab1234 | 0 |
| 5. | 159d | fedba987 | 1 |
| . | . | . | . |
| . | . | . | . |
| . | . | . | . |

METHOD OF PRODUCING ROLLING CODE AND KEYLESS ENTRY APPARATUS USING THE SAME

BACKGROUND OF THE INVENTION

1. Technical Field

The present invention relates generally to a method of producing rolling codes and a keyless entry apparatus using the same, and more particularly to a rolling code producing method of producing a sequence of different codes for ensuring high entry security and a keyless entry apparatus using the same.

2. Background of Related Art

Keyless entry systems are well known in the art for securing anti-theft characteristics in automotive vehicles. In a typical keyless entry system, a transmitter installed in a key transmits an identification code to a receiver mounted in the vehicle to determine whether the transmitted identification code is correct or not. If it is correct, doors and an alarm system are released. This offers a higher degree of security than that of mechanical key entry systems.

Since such keyless entry systems usually use a single identification code, the entry security is, as described above, improved greatly but it is not enough to ensure complete entry security.

In order to alleviate such problems, the following steps are provided:

(1) A rolling code wherein an identification code is changed every communication between a transmitter and a receiver;
(2) The rolling code is further scrambled or encrypted as a random code; and
(3) The algorithm for producing the rolling code is changed every communication of the code between the transmitter and the receiver.

These steps however still do not produce totally satisfactory results. For example, simple usage of the rolling code as in (1) may allow a subsequent rolling code to be estimated based on a known code. When the number of figures of the random code as in (2) is small, it can be easily decoded by using all possible combinations of numbers of the same figures as those of the random code. Additionally, if the same operation is performed whenever the rolling code is scrambled, the algorithm for producing the rolling code may be easily decoded based on a change in output of the code.

Changing the algorithm as in (3) requires a storage memory having a large enough capacity to store different programs, one for each algorithm. Particularly, a portable transmitter of the keyless entry system needs to be compact and to exhibit rapid response, and therefore the capacity of the storage memory and the algorithms for scrambling the rolling code need to be small and simple, respectively.

The above problems are also encountered in keyless entry systems for use in houses or office buildings and keyless access systems for use in lockers of the type which uses encrypted access codes to for avoid unauthorized access.

SUMMARY OF THE INVENTION

It is therefore a principal object of the present invention to avoid the disadvantages of the prior art.

It is another object of the present invention to provide a keyless entry system which is capable of producing rolling codes having a higher degree of security using a simple algorithm not requiring a large storage capacity.

According to one aspect of the present invention, there is provided a method of a rolling code producing method which comprises the steps of: (a) producing different rolling codes, in sequence, using an initial code variable according to a given algorithm; and (b) changing the initial code variable.

In the preferred mode of the invention, the changing changes the initial code variable after a given number of the rolling codes are produced.

The changing includes reading a given code variable out of an external storage medium to update the initial code variable.

According to another aspect of the invention, there is provided a security system which comprises: (a) a portable code transmitter producing a first rolling code using a first initial code variable according to a given algorithm and transmitting the first rolling code; (b) a receiver producing a second rolling code using a second initial code variable according to the given algorithm to compare the second rolling code with the first rolling code transmitted from the portable code transmitter, if the second rolling code matches the first rolling code, the receiver providing a security-releasing signal; and (c) a code changing circuit changing the initial code variables in the portable code transmitter and the receiver.

In the preferred mode of the invention, the security system further comprises: (d) a memory card storing therein a plurality of initial code variables; (e) a card reader responsive to input of the memory card to read one of the initial code variables out of the memory card; and (f) a means for providing the one of the initial code variables read out by the card reader to the portable code transmitter and the receiver as the first and second initial code variables, respectively.

The card reader reads the one of the initial code variables out of the memory card in a random access manner.

The security system further comprises a clock providing time information. The card reader reads the one of the initial code variables out of a memory location of the memory card corresponding to the time information provided by the clock.

The card reader is disposed within the receiver installed in a security object. The receiver includes a transmitter which transmits the initial code variable read out of the memory card to the transmitter as the first initial code variable.

The transmitter of the receiver is designed to establish electromagnetic coupling with the portable code transmitter for transmitting the one of the initial code variables read out by the card reader to the portable code transmitter.

The first and second initial code variables further include first and second subcodes, respectively. The portable code transmitter and the receiver perform a given operation on the first and second initial code variables and the first and second subcodes to produce the first and second rolling codes, respectively.

The first and second initial codes each consist of a plurality of bits. Each of the portable code transmitter and the receiver includes a first operation circuit dividing one of the first and second initial code into a higher-order bit group and a lower-order bit group, a second operation circuit performing a NOT operation on the sum of the higher-order bit groups, a third operation circuit performing an OR operation on the lower-order bit group and one of the first and second subcodes, a fourth operation circuit performing an exclusive-OR operation on a value resulting from the NOT operation on a value derive by the third operation circuit and the one of the first and second subcodes, a fifth operation circuit performing the exclusive-OR operation on a value resulting from the NOT operation on a value derived by the second operation circuit and the value derived by the third operation circuit, and a sixth operation circuit combining a value derived by the fourth operation circuit and a value derived by the fifth operation circuit as the higher-order bit group and the lower-order bit group, respectively, to produce one of the first and second rolling codes and to provide the one of the first and second rolling codes as one of the first and second initial code variables.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 3 shows a look-up table storing therein initial code variable used for producing rolling codes;

DESCRIPTION OF THE PREFERRED EMBODIMENT

Figure 1:
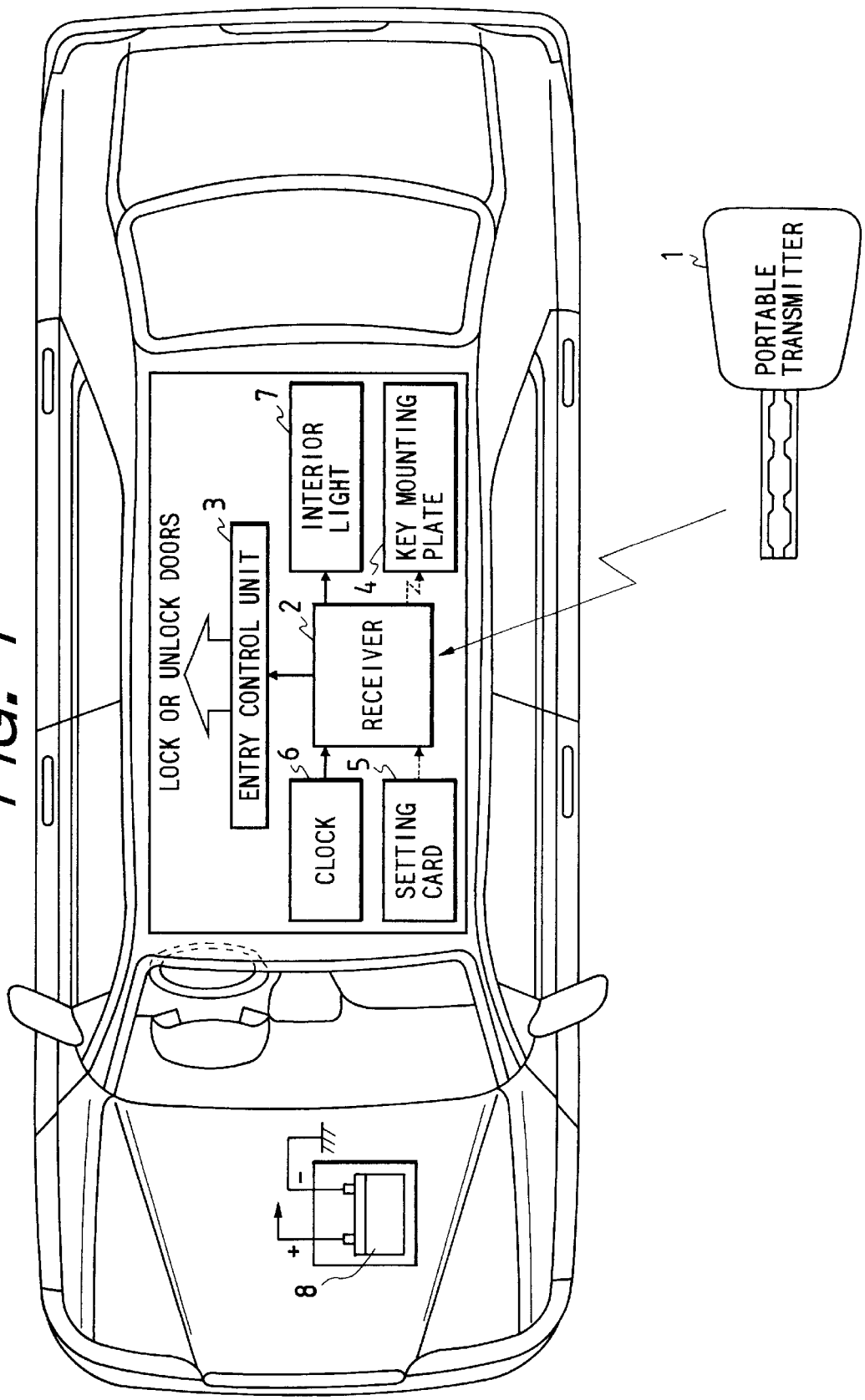
FIG. 1 is a block diagram which shows a keyless entry system used with an automotive vehicle according to the present invention.

Referring now to the drawings, particularly to FIG. 1, there is shown a keyless entry system for an automotive vehicle according to the present invention.

The keyless entry system generally includes a transmitter 1 installed in a portable key, a receiver 2, and an entry control unit 3. The receiver 2 and the entry control unit 3 are installed in the vehicle. When unlocking doors of the vehicle, a vehicle operator transmits a rolling code through the transmitter 1 to the receiver 2. The operator may alter, through the portable initial code variable setting card 5, an initial code variable, as needed, used in producing the rolling code. The change in the initial code variable makes it difficult to estimate the structure of the rolling code even if the algorithm for producing the rolling code is simple or the same algorithm is used each time the rolling code is changed.

The receiver 2 also has a transmitter function of sending the initial code variable set by the initial code variable setting card 5 to the transmitter 1 for storing it in a memory installed therein. This radio communication is, as discussed later in detail, achieved with electromagnetic coupling using an LC oscillation circuit between the receiver 2 and the transmitter 1 placed on the key-mounting plate 4 arranged near the receiver 2. This permits the initial code variable to be sent from the receiver 2 to the transmitter in a non-contact manner within a safe distance away from thieves or unauthorized persons.

The keyless entry system also uses the clock 6 and the interior light 7 which are usually installed in the vehicle. Specifically, time information derived from the clock 6 is used to randomly access one of the memory locations of the initial code variable setting card 5 for reading one of the initial code variables out of the initial code variable setting card 5. The interior light 7 is flashed on and off to inform the operator to present another rolling code from the transmitter 1 to the receiver 2.

The clock 6, the interior light 7, the receiver 2, and the entry control unit 3 are connected to the storage battery 8 installed in the vehicle.

Figure 2:
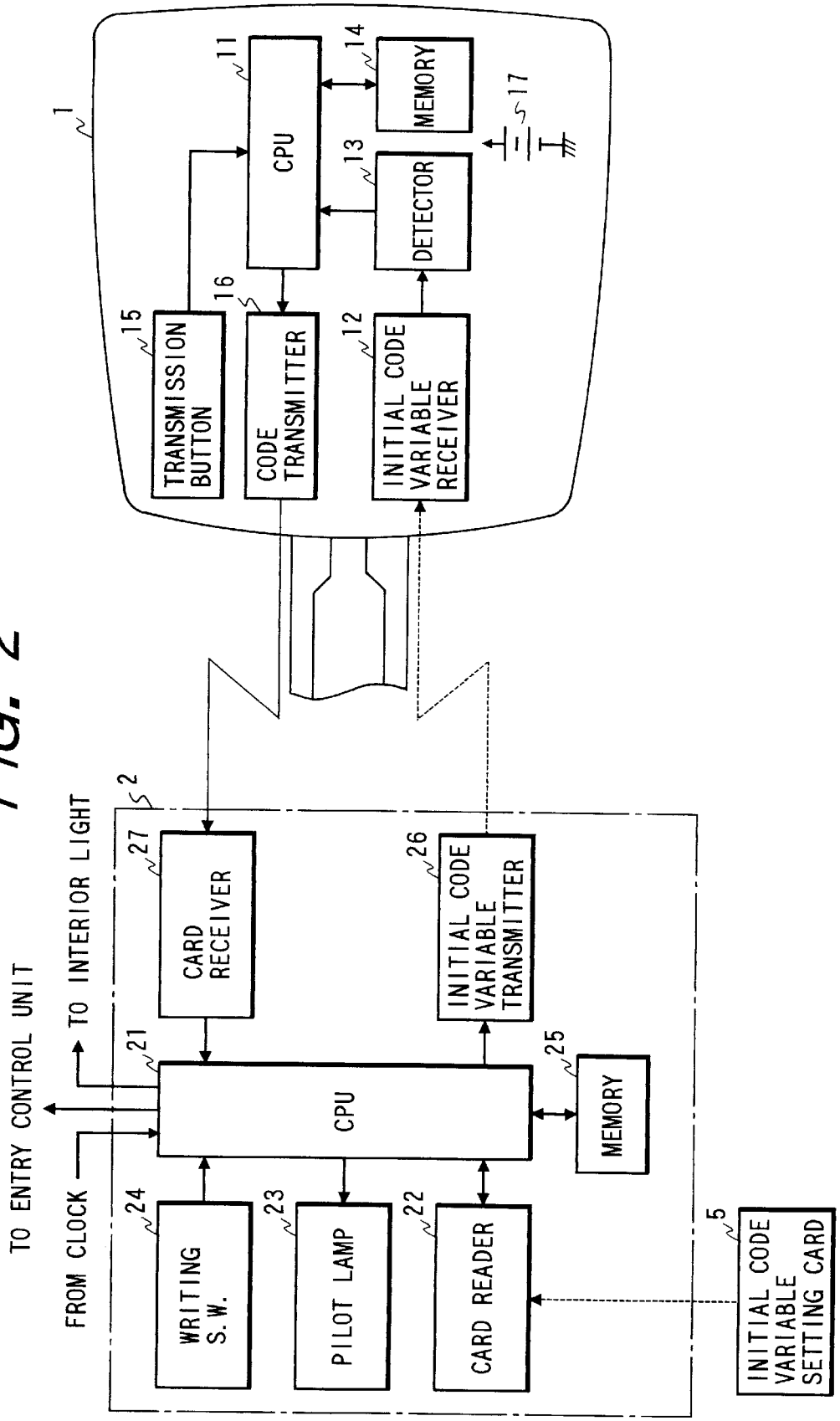
FIG. 2 is a block diagram which shows a transmitter installed in a portable key and a receiver disposed in a vehicle.

The transmitter 1 includes, as shown in FIG. 2, the CPU 11, the initial code variable receiver 12, the detector 15, the memory (RAM) 14, the transmitter button 15, the code transmitter 16, and the battery 17.

The CPU 11 performs given operations, as discussed later in detail, for producing the rolling code and controlling each element of the transmitter 1. The initial code variable receiver 12 includes an LC oscillation circuit which establishes electromagnetic coupling with the initial code variable transmitter 26 of the receiver 2 when the transmitter 1 is placed on the key-mounting plate 4. The transmission of the initial code variable from the initial code variable transmitter 26 to the initial code variable receiver 12 is accomplished, for example, with amplitude modulation. The initial code variable received by the initial code variable receiver 12 is demodulated by the detector 13 and stored in the memory 14 through the CPU 11.

The transmitter button 15 is disposed on a grip of the key. When the operator depresses the transmitter button 15, the CPU 11 starts to perform the given operations based on the initial code variable to generate the rolling code. The rolling code is then transmitted from the code transmitter 16 to the receiver 12 in the vehicle. The code transmitter 16 includes a known circuit which modulates the code provided from the CPU 11 to a high-frequency signal and outputs it. The battery 17 supplies the electric power to each circuit element of the transmitter 1.

The receiver 2 includes the CPU 21, the card reader 22, the pilot lamp 23, the writing switch 24, the memory (RAM.) 25, the initial code variable transmitter 26, and the code receiver 27.

The CPU 21 performs given operations for producing a sequence of rolling codes and controlling each element of the receiver 2. The CPU 21 also determines whether the rolling code transmitted from the transmitter 1 and received by the code receiver 27 is matched with a preselected one of the rolling codes produced by itself and provides a control signal to the entry control unit 3. The CPU 21 further uses the time information from the clock 6 and controls an on/off operation of the interior light 7.

The card reader 22 is responsive to loading of the portable initial code variable setting card 5 by the operator to gain random access to one of memory locations of the card 5 for reading out one of the initial code variables. Specifically, the card reader 22 uses the time information from the clock 6 such as minutes or seconds to retrieve one of the initial code variables stored in one of the memory locations whose address corresponds to the time information. This facilitates the random access to the initial code variable setting card 5 without use of a special device such as a random number generator.

The pilot lamp 23 is used to provide given information, as described later in detail, to the operator when the initial code variable is altered. The writing switch 24 is turned on by the operator when the initial code variable is altered. The memory 25 stores therein the sequence of rolling codes produced by the CPU 21 and the initial code variable.

The initial code variable transmitter 26 includes an LC oscillation circuit which establishes electromagnetic coupling with the initial code variable receiver 12 of the transmitter 1 for transmitting the altered initial code variable thereto. Specifically, the CPU 21 modulates the amplitude of the initial code variable to be transmitted to the transmitter 1 by an amount corresponding to a value of the initial code variable and energizes an antenna coil (not shown) installed in the initial code variable transmitter 26 according to the modulated amplitude.

FIG. 3 shows a plurality of initial code variables and subcodes stored at respective addresses in the initial code variable setting card 5. The initial code variables and the subcodes are both expressed in hexadecimal number format. Flags are also stored which indicate whether the initial code variables have been used or not. Each of the flags is changed from "0" to "1" when a corresponding one of the initial code variables has been read out by the card reader 5. The card reader 22 of the receiver 2 refers to the flags, to determine if there is the flag of "1" meaning that corresponding one of the initial code variables has already been used. If so, the card reader 22 skips this initial code and looks up the subsequent initial code variables. This further improves the secrecy of the rolling code to be generated.

The initial code variable setting card 5 stores therein 2,000 to 3000 initial code variables. This is because the number of code transmissions performed by a keyless entry system during the lifetime of the vehicle is usually 20,000 to 30,000, and one initial code variable is used to produce 100 to 150 rolling codes.

The CPU 21 of the receiver 2 stores in the memory 25 one of the initial code variables and the subcode thereof read out of the initial code variable setting card 5 through the card reader 22 and then performs a program or sequence of logical operations, as discussed below in FIG. 4, to produce each of the rolling codes.

Figure 4:
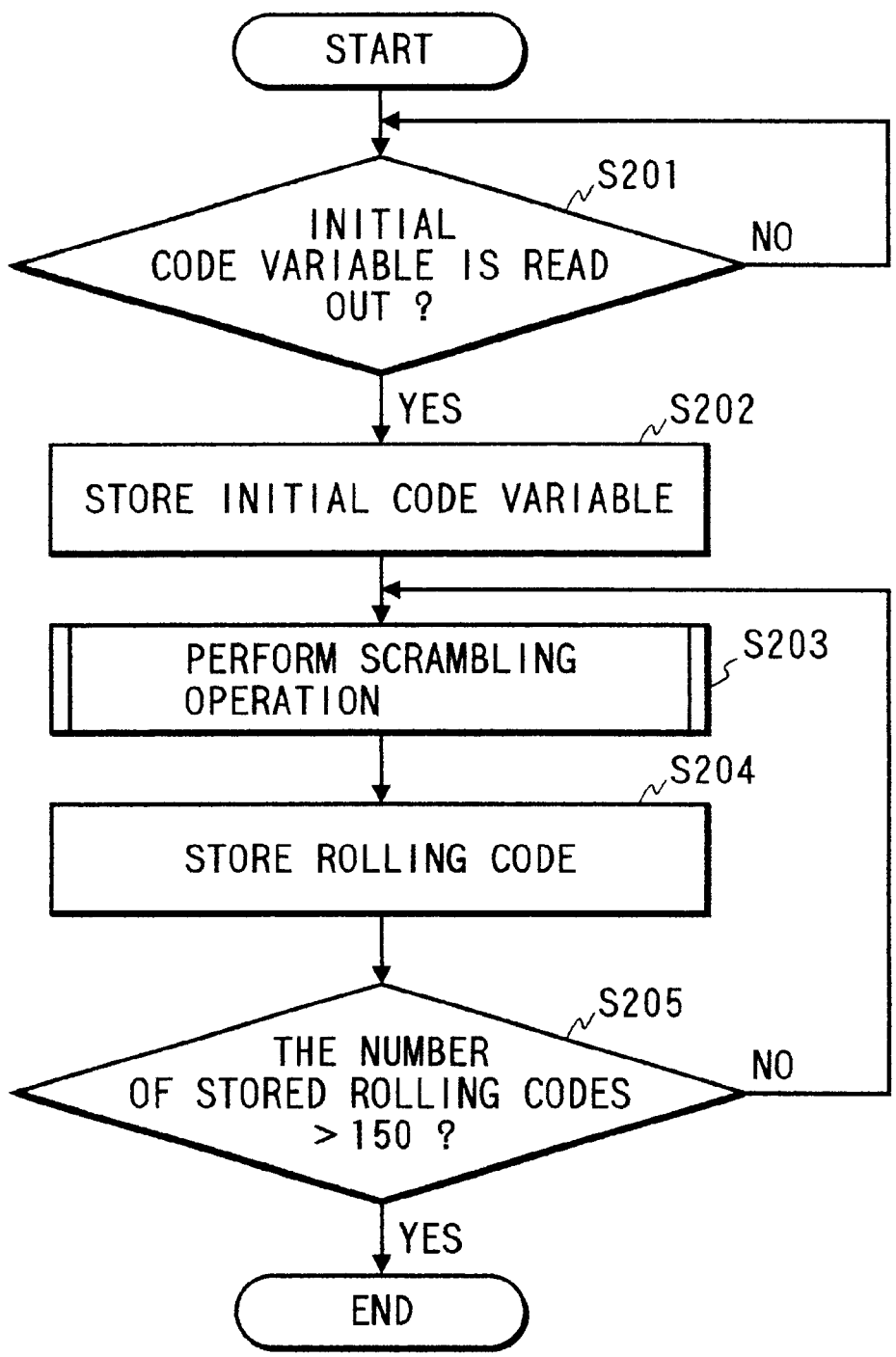
FIGS. 4 and 5 show a flowchart of a program performed by a receiver in a vehicle for producing rolling codes.

Upon initiation of the program in FIG. 4, the routine proceeds to step 201 wherein it is determined whether one of the initial code variables and corresponding one of the subcodes stored in the initial code variable setting card 5 have been read out by the card reader 22 or not. If a YES answer is obtained, then the routine proceeds to step 202 wherein the initial code variable and the subcode read out by the card reader 22 are stored in the memory 25 or if the initial code variable and the subcode are already stored in the memory 25, they are changed to the last ones.

Figure 5:
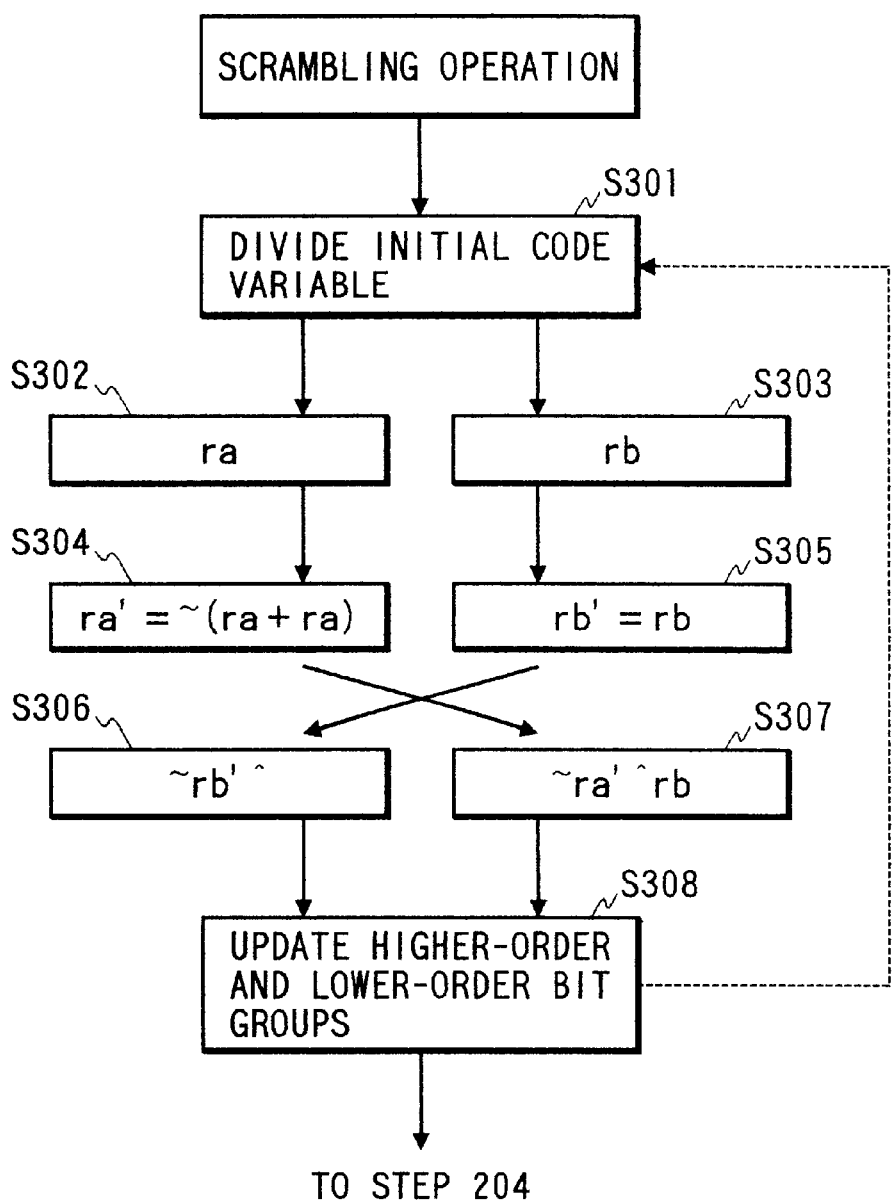

The routine then proceeds to step 203 wherein a scrambling operation, as shown in FIG. 5, is performed based on the initial code variable and the subcode stored in the memory 25. In the scrambling operation as discussed below, it is assumed that the initial code variable "00000001Hx" and the subcode "1234Hx" stored at the address "1" in FIG. 3 are used.

First, the initial code variable is divided into two groups: a higher-order bit group ra and a lower-order bit group rb (steps 301 to 303). In this example, the higher-order bit group ra="0000Hx", and the lower-order bit group rb="0001Hx".

In step 304, the NOT operation is performed on the sum of the higher-order bit groups ra as shown below.

$ra'=\sim(ra+ra)$ $=FFFFHX$ where "~" indicates the logical NOT operation.

In step 305, the OR operation is performed on the lower-order bit group rb and the subcode, as shown below.

$rb'=rb \mid subcode$ $=1235Hx$ where "|" indicates the logical OR operation.

After step 305, the routine proceeds to step 306 wherein the exclusive-OR operation is performed on a value resulting from the NOT operation on rb' derived in step 305 and the subcode, as shown below.

$\sim rb' \sim subcode$ $=FFFEHx$ where "~" indicates the logical exclusive-OR operation.

After step 304, the routine proceeds to step 307 wherein the exclusive-OR operation is performed on a value resulting from the NOT operation on ra' derived in step 304 and rb' derived in step 305, as shown below.

$(\sim ra')^\wedge rb'$ $=1235Hx$

Upon completion of the operations in steps 306 and 307, the routine proceeds to step 308 wherein the values derived in steps 306 and 307 are defined as the higher-order bit group and the lower-order bit group, respectively, and then added together to provide the first rolling code of "FFFE1235Hx".

After step 308, the routine proceeds to step 204 in FIG. 4 wherein the rolling code derived in step 308 is stored in the memory 25. The routine then proceeds to step 205 wherein it is determined whether the number of the rolling codes stored in the memory 25 reaches a given value, for example, 150 or not. If a NO answer is obtained, then the routine returns back to step 203 wherein the rolling code derived in step 308 is used as an initial code variable for a subsequent scrambling operation. Note that the value of 150 is determined by adding an allowance of window width, as will be described later, to the number of the rolling codes of 100.

Figure 6:
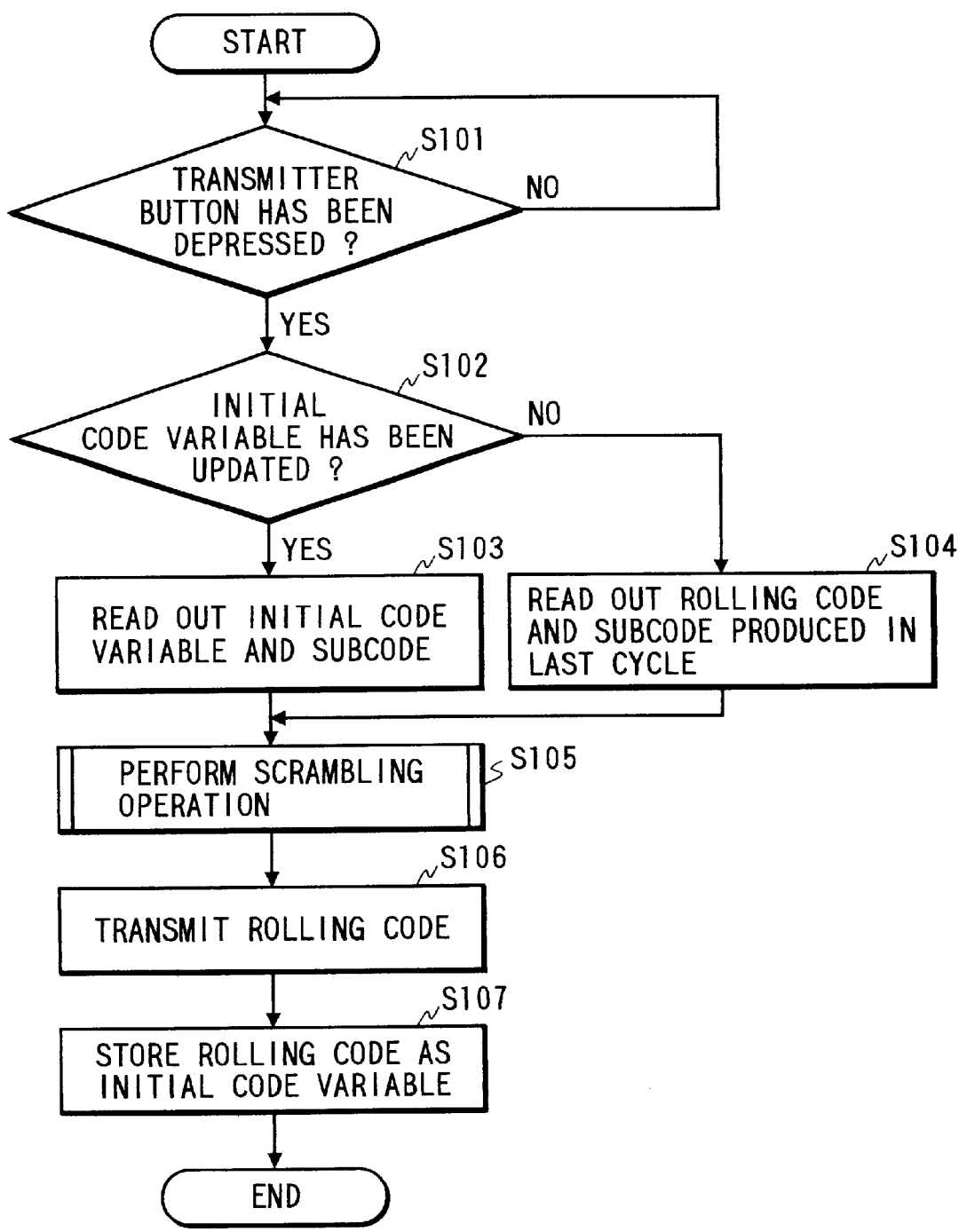
FIG. 6 shows a flowchart of a program performed by a transmitter installed in a portable key for producing rolling codes.

FIG. 6 shows a rolling code-producing program performed by the CPU 11 of the transmitter 1.

After entering the program, the routine proceeds to step 101 wherein it is determined whether the transmitter button 15 has been depressed or not. If a YES answer is obtained, then the routine proceeds to step 102 wherein it is determined whether code transmission to be performed is for the first time or not after the initial code variable is updated. This determination may be accomplished by monitoring a flag which is set every update in the initial code variable and reset in response to the first code transmission to the receiver 2 performed after each update in the initial code variable.

If a YES answer is obtained in step 102, then the routine proceeds to step 103 wherein the initial code variable and the subcode are read out of the memory 14. The routine then proceeds to step 105 wherein the initial code variable and the subcode derived in step 103 are used in a scrambling operation which is identical with the one shown in FIG. 5.

If a NO answer is obtained in step 102, then the routine proceeds to step 104 wherein a rolling code produced and transmitted in the last program cycle and a corresponding subcode are read out of the memory 14. The routine then proceeds to step 105 wherein the rolling code and the subcode derived in step 104 are used in the scrambling operation. Specifically, the rolling code produced one program cycle before is used as an initial code variable for producing a new rolling code in this program cycle.

After a rolling code is produced in step 105, the routine proceeds to step 106 wherein the rolling code is transmitted from the code transmitter 16. The routine then proceeds to step 107 wherein the rolling code is stored in the memory 14 as an initial code variable used in a subsequent program cycle.

Figure 7:
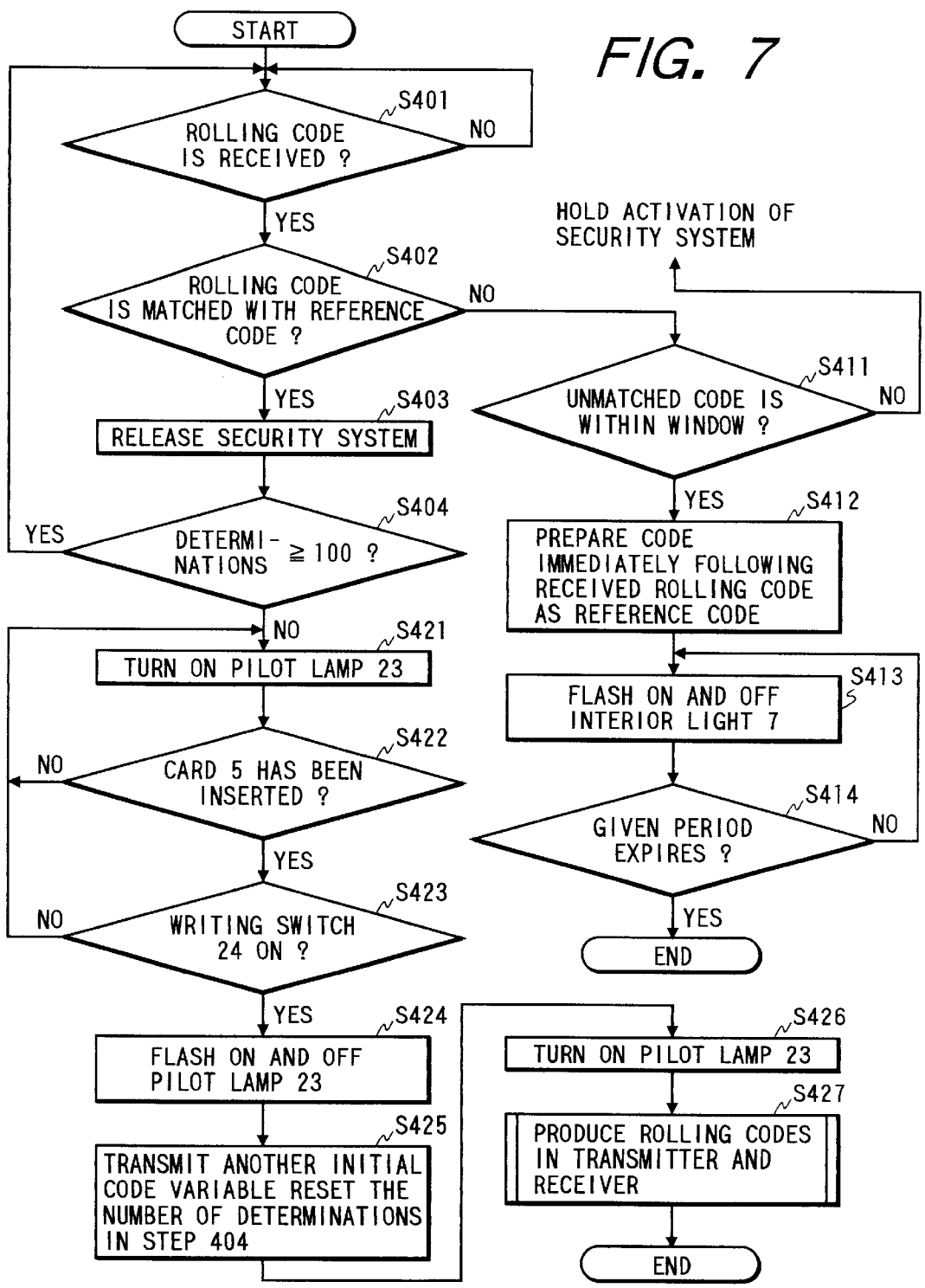
FIG. 7 shows a flowchart of a main program performed by a keyless entry system of the invention.

FIG. 7 shows a program performed by the CPU 21 of the receiver 2 in the vehicle for controlling the vehicle entry security and updating the initial code variable used in the scrambling operation as discussed above.

After entering the program, the routine proceeds to step 401 wherein a rolling code is received from the transmitter 1 or not. If a YES answer is obtained, then the routine proceeds to step 402 wherein the received rolling code is compared with a reference code, that is, a corresponding one of rolling codes, for example, which was first stored in the memory 25 to determine whether they are matched with each other or not.

If a YES answer is obtained in step 402, then the routine proceeds to step 403 wherein a releasing signal is provided to the entry control unit 3 to release a security system such as door locks for allowing authorized access.

Subsequently, the routine proceeds to step 404 wherein it is determined whether the number of determinations in step 402 is less than or equal to 100 or not. If a YES answer is obtained, then the routine returns back to step 401.

If a NO answer is obtained in step 402 meaning that the received rolling code is matched with the rolling code first stored in the memory 25, then the routine proceeds to step 411 wherein it is determined whether the unmatched code, that is, the received rolling code lies within a window or not. If a YES answer is obtained, then the routine proceeds to step 412 wherein one of the rolling codes stored in the memory 25 immediately following the received rolling code is prepared as the reference code used in the next determination in step 402.

Figure 8:
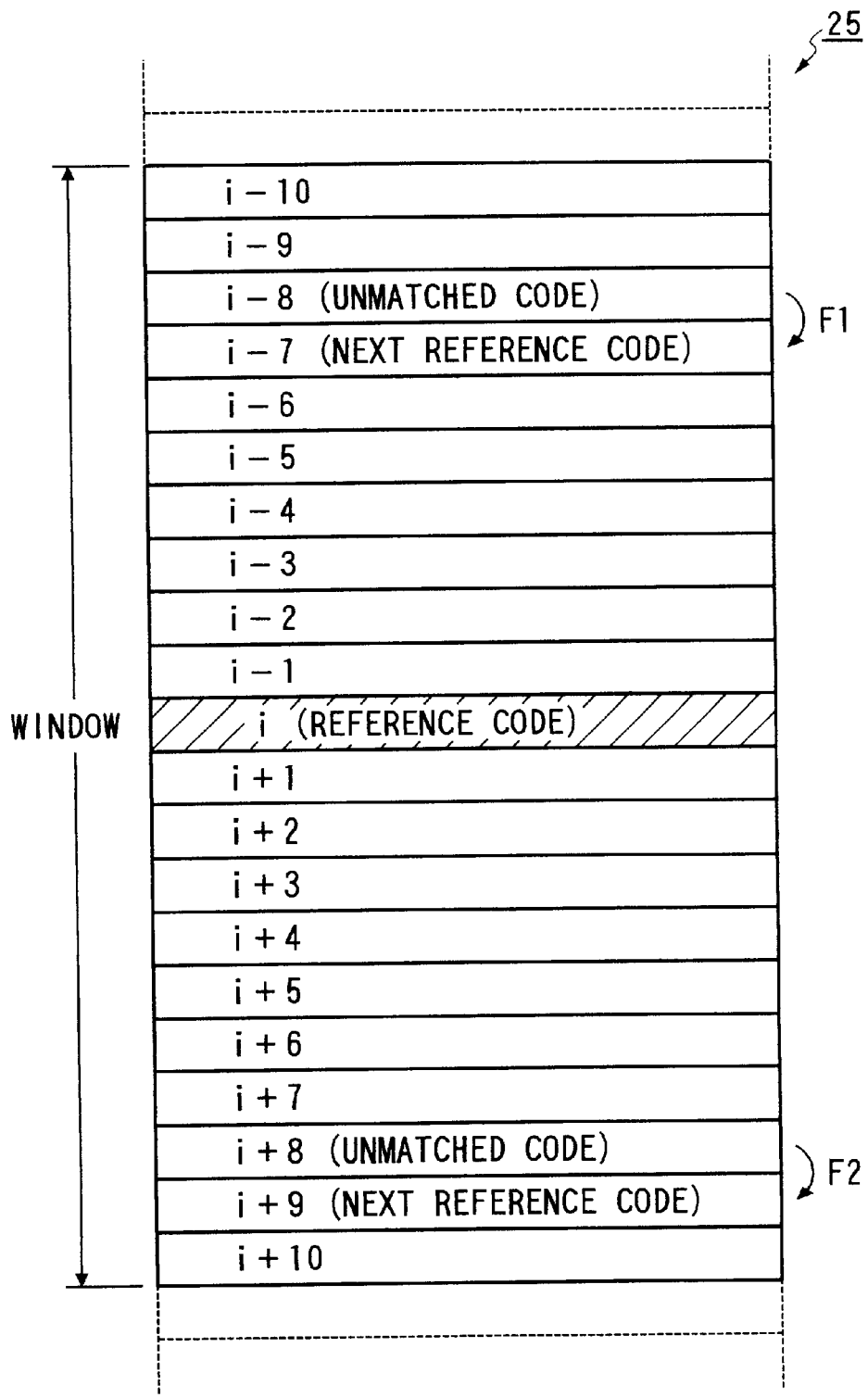
FIG. 8 shows an allowable range or window used in rolling code authentication.

FIG. 8 shows one example of the window used in the determination in step 411. In this example, the window is a code authenticable range of ±10 codes across the reference code used in the determination in step 402 (the (i)th rolling code in FIG. 8). For example, if the transmitter button 15 of the transmitter 1 has been depressed in error, it may cause the rolling code next transmitted from the transmitter 1 to fail to match the rolling code used as the reference code in the determination in step 402. The provision of the window however compensates for such an error of the transmitter 1.

Specifically, when the received rolling code which has been determined not to be matched with the reference code in step 402 lies within the window, the preparation of one of the rolling codes stored in the memory 25 next to the received rolling code as a reference code used in a subsequent determination in step 402 allows a rolling code next transmitted from the transmitter 1 to coincide with the reference code prepared in step 412.

For example, when the received rolling code determined to be unmatched with the reference code in step 402 coincides with the (i−8)th rolling code, as shown in FIG. 8, within the window, the preparation of the (i−7)th rolling code, as indicated by an arrow F1, as a next-used reference code allows a rolling code next transmitted from the transmitter 1 to coincide with the next-used reference code as long as the transmitter 1 operates correctly.

Alternatively, when the received rolling code determined to be unmatched with the reference code in step 402 coincides with the (i+8)th rolling code, as shown in FIG. 8, within the window, the preparation of the (i+9)th rolling code, as indicated by an arrow F2, as a next-used reference code allows a rolling code next transmitted from the transmitter 1 to coincide with the next-used reference code as long as the transmitter 1 operates correctly.

After step 412, the routine proceeds to step 413 wherein the interior light 7 is flashed on and off for a given period time for urging the operator to transmit another rolling code. The routine then proceeds to step 414 wherein it is determined whether the given period of time expires or not. If a NO answer is obtained, then the routine returns back to step 413. Alternatively, if a YES answer is obtained, then the program terminates.

When the operator depresses the transmitter button 15 again in response to a flash of the interior light 7, the program restarts at step 401.

If a NO answer is obtained in step 411 meaning that the received rolling code is out of the window, the CPU 21 holds activation of the security system through the entry control unit 3.

If a NO answer is obtained in step 404 meaning that the number of determinations step 402 exceeds 100, then the routine proceeds to step 421 wherein the pilot lamp 23 in the receiver 2 is turned on to inform the operator that the initial code variable should be changed.

When the operator performs the steps of:
(1) placing the key or transmitter 1 on the key mounting plate 4,
(2) inserting the initial code variable setting card 5 carried by the operator into the card reader 22, and
(3) turning on the writing switch 24 of the receiver 2, these operations are ascertained through steps 422 and 423, and the routine proceeds to step 424.

In step 424, the pilot lamp 23 is flashed on and off to inform the operator that the initial code variable is being updated in the transmitter 1 and the receiver 2. Subsequently, in step 425, another initial code variable and a corresponding subcode are read out of the initial code variable setting card 5 and stored in the memory 25. These codes are transmitted from the initial code variable transmitter 26 to the transmitter 1. The number of determinations in step 404 is reset to zero.

The routine then proceeds to step 426 wherein the pilot lamp 23 is turned off to inform the operator that the update of the initial code variable in step 424 is completed. The turning off of the pilot lamp 23 also informs the operator that the operations of the key or transmitter 1 placed on the key mounting plate 4 and the initial code variable setting card 5 inserted into the card reader 22 are completed.

After step 426, the routine proceeds to step 427 wherein the transmitter 1 and the receiver 2 perform the programs, as shown in FIGS. 4 to 7, to produce the rolling codes, respectively.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the update of the initial code variable is not limited to the above format and may be performed in various manners without increase in storage capacity of a memory. Specifically, the initial code variable may be altered according to a simple rule (e.g., 1, 2, 3, . . . ). This also ensure high security.

The receiver 2 produces 100 to 150 sequential rolling codes while the transmitter 1 produces sequential rolling codes, one in each transmission operation, however, the receiver 2 may produce the rolling codes, one in each reception of a rolling code from the transmitter 1, and the transmitter 1 may produce a given number of rolling codes simultaneously.

The RAMs 14 and 25 may be placed with programable ROMs such as EPROMs or EEPROMs. In this case, even if the supply of power from the batteries 8 and 17 is stopped, data stored in the memories 14 and 25 are retained.

The pilot lamp 23 may be placed with an audio or visual indicator such as a buzzer or a display.

The keyless entry system, as discussed above, may be used with various types of security system such as electronic key systems wherein a transponder is installed in a portable key or the reaction of a key is monitored by a receiver mounted in a vehicle to release vehicle entry security, keyless entry systems used in houses or office buildings, and electronic locker systems.

What is claimed is:

1. A security system for a vehicle, the security system comprising:

a receiver configured for installation in the vehicle, the receiver being adapted to (i) produce a number of rolling codes using a first initial code variable according to an algorithm and (ii) transmit the first initial code variable;

a portable code transmitter configured to (i) receive the transmitted first initial code variable, (ii) produce a first rolling code based upon the first initial code variable in accordance with the algorithm, and (iii) transmit the first rolling code to the receiver; and means, within the receiver for (i) comparing the first rolling code with the number of rolling codes and (ii) providing a security-releasing signal if the first rolling code matches one of the number of codes, the receiver including an initial code variable changing circuit adapted to change the first initial code variable by producing at least a second initial code variable for replacing the first initial code variable and transmitting the at least second initial code variable to the portable code transmitter for storage in place of the first initial code variable.

2. A security system as set forth in claim 1, further comprising:

a memory card storing therein a plurality of initial code variables; and a card reader responsive to receiving an input from said memory card to read one of the initial code variables out of said memory card as the at least second initial code variable;

wherein said code changing circuit provides the one of the initial code variables read out by said card reader to said portable code transmitter and said receiver as the first and at least second initial code variables, respectively.

3. A security system as set forth in claim 2, wherein said card reader reads the one of the initial code variables out of said memory card in a random access manner.

4. A security system as set forth in claim 3, further comprising a clock providing time information, and wherein said card reader reads the one code variable of the initial code variables out of a memory location of said memory card corresponding to the time information provided by the clock.

5. A security system as set forth in claim 2, wherein said card reader is disposed within said receiver, and wherein said receiver includes a transmitter which transmits the one of the initial code variables read out of said memory card to said transmitter as the first initial code variable.

6. A security system as set forth in claim 5, wherein the transmitter of said receiver is designed to establish electromagnetic coupling with said portable code transmitter for transmitting the one of the initial code variables read out by said card reader to said portable code transmitter.

7. A security system as set forth in claim 1, wherein the first and at least second initial code variables further include first and at least second subcodes, respectively, and wherein said portable code transmitter and said receiver perform a given operation on the first and at least second initial code variables and the first and second subcodes to produce the first and at least second rolling codes, respectively.

8. A security system as set forth in claim 7, wherein the first and at least second initial code variables codes each includes of a plurality of bits, and wherein each of said receiver and portable code transmitter includes (i) a first operation circuit dividing one of the first and at least second initial code variables into a higher-order bit group and a lower-order bit group, (ii) a second operation circuit performing a NOT operation on the sum of the higher-order bit groups, (iii) a third operation circuit performing an OR operation on the lower-order bit group and one of the first and at least second subcodes, (iv) a fourth operation circuit performing an exclusive-OR operation on a value resulting from the NOT operation on a value derive by the third operation circuit and the one of the first and at least second subcodes, (v) a fifth operation circuit performing the exclusive-OR operation on a value resulting from the NOT operation on a value derived by the second operation circuit and the value derived by the third operation circuit, and (vi) a sixth operation circuit combining a value derived by the fourth operation circuit and a value derived by the fifth operation circuit as the higher-order bit group and the lower bit group, respectively, to produce one of the first and at least second rolling code variables and to provide the one of the first and at least second rolling code variables as one of the first and at least second rolling codes.

9. A rolling code producing method for use in a security system for a vehicle comprising:

producing a number of rolling codes in a receiver, the producing being (i) based upon a first initial code variable and (ii) in accordance with an algorithm, and transmitting the first initial code variable;

receiving the transmitted first initial code variable in a transmitter and producing a first rolling code based upon the received first initial code variable in accordance with the algorithm, the first rolling code being produced in the transmitter, and (i) comparing the first rolling code and the number of rolling codes and (ii) providing a security-releasing signal if the first rolling code matches one of the number of codes; and changing the first initial code variable by producing at least a second initial code variable and transmitting the at least second initial code variable to the portable code transmitter from the receiver for storage in place of the first initial code variable.

10. A rolling code producing method as set forth in claim 9, wherein said changing changes the initial code variables after a given number of the rolling codes are produced.

11. A rolling code producing method as set forth in claim 10, wherein said changing includes reading the at least second initial code variable out of an external storage medium to update the first initial code variable.

12. A security system as set forth in claim 9, wherein the transmission of the at least second initial code variable from said receiver to said portable transmitter is accomplished by electromagnetically coupling said portable code transmitter to said receiver.

13. A security system as set forth in claim 1, wherein the transmission of the at least second initial code variable from said receiver to said portable transmitter is accomplished by electromagnetically coupling said portable code transmitter.

* * * * *